United States Patent
Bharadwaj et al.

(10) Patent No.: US 9,998,873 B2
(45) Date of Patent: Jun. 12, 2018

(54) PRIORITIZING CUSTOMER FOLLOW-UP ACTIONS BASED ON MOBILE DEVICE LOCATION DATA

(71) Applicant: International Business Machines Corporation, Armonk, NY (US)

(72) Inventors: Samarth Bharadwaj, Bangalore (IN); Vinayaka Pandit, Bangalore (IN); Karthik Visweswariah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 14/992,907

(22) Filed: Jan. 11, 2016

(65) Prior Publication Data

US 2017/0201863 A1    Jul. 13, 2017

(51) Int. Cl.
*H04W 4/02*    (2018.01)
*G06Q 20/10*    (2012.01)
*G06Q 20/32*    (2012.01)

(52) U.S. Cl.
CPC .......... *H04W 4/025* (2013.01); *G06Q 20/102* (2013.01); *G06Q 20/3224* (2013.01)

(58) Field of Classification Search
CPC . G06Q 30/0248; G06Q 20/32; G06Q 20/3224
See application file for complete search history.

(56) References Cited

U.S. PATENT DOCUMENTS

| | | | |
|---|---|---|---|
| 8,504,456 B2 | 8/2013 | Griffin et al. | |
| 2002/0147680 A1 | 10/2002 | Cho et al. | |
| 2003/0033245 A1 | 2/2003 | Kahr | |
| 2012/0209773 A1* | 8/2012 | Ranganathan | G06Q 20/3224 705/44 |
| 2014/0195427 A1 | 7/2014 | Reeve et al. | |
| 2014/0214643 A1 | 7/2014 | Crowe et al. | |
| 2014/0258083 A1 | 9/2014 | Achanta et al. | |
| 2017/0069034 A1* | 3/2017 | Luciani | G06Q 40/08 |

FOREIGN PATENT DOCUMENTS

| | | |
|---|---|---|
| CN | 101950451 A | 1/2011 |
| WO | WO2013019103 A1 | 2/2013 |

OTHER PUBLICATIONS

Liu, Alice T, et al., "Mobile Banking—The Key to Building Credit History for the Poor?", Apr. 2009, 44 pages, United States Agency for International Development, Kenya Credit Bureau and M-banking Research Study, Contract No. FOG Award No. MO-061, under GEG-I-00-02-00025-00.

* cited by examiner

*Primary Examiner* — Omoniyi Obayanju
(74) *Attorney, Agent, or Firm* — Ference & Associates LLC

(57) ABSTRACT

One embodiment provides a method of prioritizing mobile finance customer follow up actions based on mobile device location data, the method including: utilizing at least one processor to execute computer code that performs the steps of: associating a mobile finance customer account with a mobile device; receiving a plurality of locations of the mobile device, the plurality of locations including at least one non-transactional location associated with a predetermined geographic location of interest; forming a mobility profile based on the plurality of locations; selecting, using a processor, a follow up action type based at least in part on the mobility profile; and transmitting, using a mobile network, a communication of the follow up action type to the mobile device. Other aspects are described and claimed.

20 Claims, 4 Drawing Sheets

PRIORITIZING CUSTOMER FOLLOW-UP ACTIONS BASED ON MOBILE DEVICE LOCATION DATA

BACKGROUND

Adoption of mobile devices such as smart phones, tablets and hybrid devices continues to increase. Users of such devices increasingly conduct business transactions using such devices. For example, mobile banking applications allow mobile device users to access account information from various financial institutions.

Location based data, e.g., mobile device location, may be utilized in many location based services. Common examples include navigation applications, advertising techniques, and the like. While location-based services have been of interest in other domains and put to other uses, mobile banking and financial applications have generally not incorporated such services. Particularly in non-traditional lending contexts, like micro-financing, location based services have not been incorporated into mobile applications for the purpose of continuously measuring a customer's propensities.

BRIEF SUMMARY

In summary, one aspect of the invention provides a method of prioritizing mobile finance customer follow-up actions based on mobile device location data, the method comprising: utilizing at least one processor to execute computer code that performs the steps of: associating a mobile finance customer account with a mobile device; receiving a plurality of locations of the mobile device, the plurality of locations including at least one non-transactional location associated with a predetermined geographic location of interest; forming a mobility profile based on the plurality of locations; selecting, using a processor, a follow-up action type based at least in part on the mobility profile; and transmitting, using a mobile network, a communication of the follow-up action type to the mobile device.

Another aspect of the invention provides an apparatus for prioritizing mobile finance customer follow-up actions based on mobile device location data, the apparatus comprising: at least one processor; and a computer readable storage medium having computer readable program code embodied therewith and executable by the at least one processor, the computer readable program code comprising: computer readable program code that associates a mobile finance customer account with a mobile device; computer readable program code that receives a plurality of locations of the mobile device, the plurality of locations including at least one non-transactional location associated with a predetermined geographic location of interest; computer readable program code that forms a mobility profile based on the plurality of locations; computer readable program code that selects, using a processor, a follow-up action type based at least in part on the mobility profile; and computer readable program code that transmits, using a mobile network, a communication of the follow-up action type to the mobile device.

An additional aspect of the invention provides a computer program product for prioritizing mobile finance customer follow-up actions based on mobile device location data, the computer program product comprising: a computer readable storage medium having computer readable program code embodied therewith, the computer readable program code comprising: computer readable program code that associates a mobile finance customer account with a mobile device; computer readable program code that receives a plurality of locations of the mobile device, the plurality of locations including at least one non-transactional location associated with a predetermined geographic location of interest; computer readable program code that forms a mobility profile based on the plurality of locations; computer readable program code that selects, using a processor, a follow-up action type based at least in part on the mobility profile; and computer readable program code that transmits, using a mobile network, a communication of the follow-up action type to the mobile device.

A further aspect of the invention provides a method of prioritizing mobile finance customer follow up actions based on mobile device location data, the method comprising: utilizing at least one processor to execute computer code that performs the steps of: with a mobile device associated a mobile finance customer account, detecting a plurality of locations of the mobile device over a communications network, the plurality of locations including at least one non-transactional location associated with a predetermined geographic location of interest assigned a known account risk; adjusting, using a processor of the mobile device, a risk factor assigned to the mobile finance customer account based on the amount of time spent at the non-transactional location associated with geographic location of interest; selecting, using a processor of the mobile device, a follow up action type based at least in part on a mobility profile comprising location data specific to the mobile finance customer; and providing, using an output device of the mobile device, a follow up action of the follow up action type selected.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
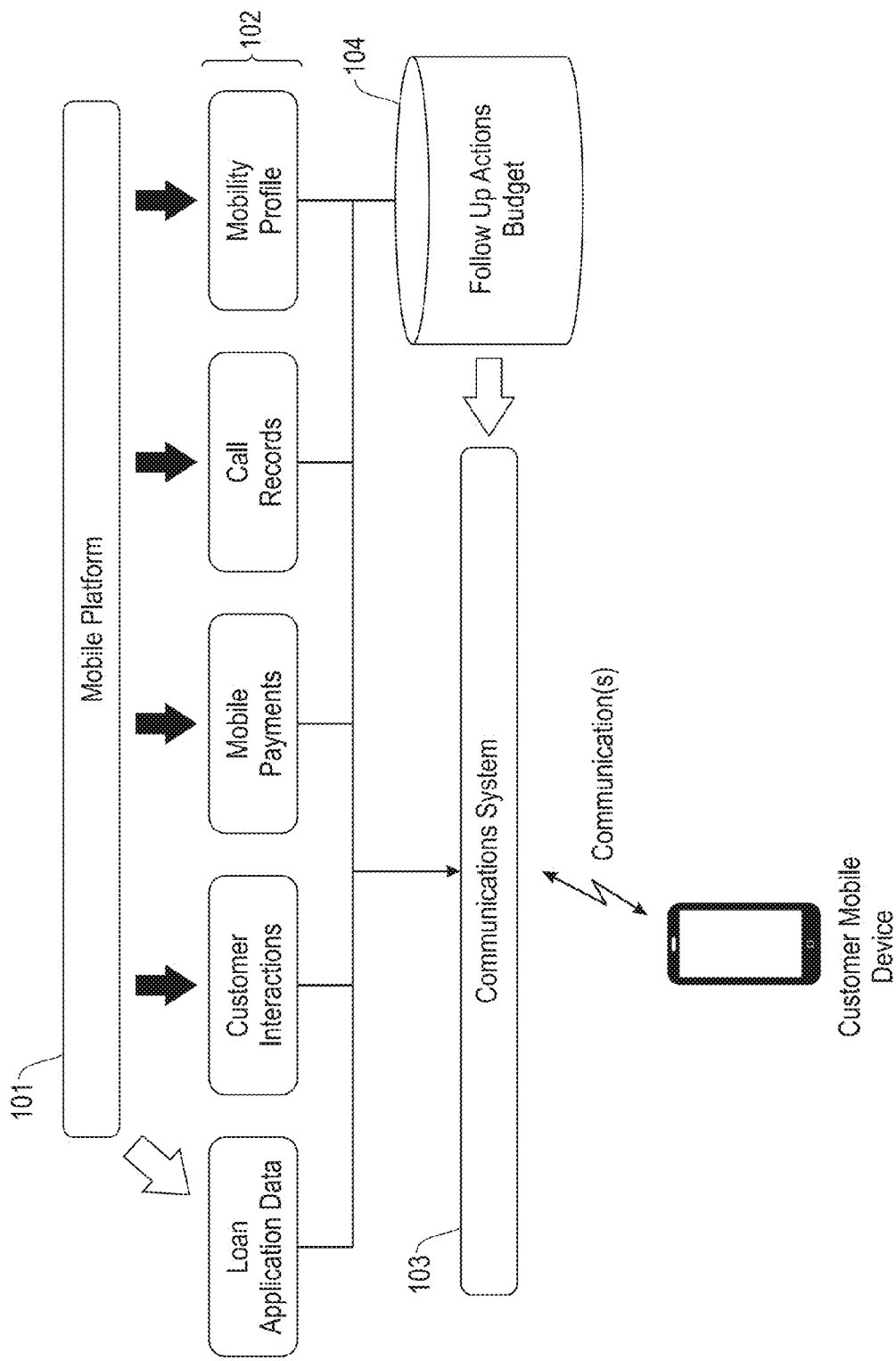
FIG. 1 illustrates an exemplary mobility platform for prioritizing mobile finance customer follow-up actions based on mobile device location data and related data.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an exemplary embodiment, most if not all of the process steps, components and outputs discussed with respect to FIGS. 1-4 can be performed or utilized by way of a processing unit or units and system memory such as those indicated, respectively, at 16' and 28' in FIG. 4, whether on a server computer, a client computer, a node computer in a distributed network, or any combination thereof.

In a large-scale collection system, e.g., such as utilized in micro-finance or micro-credit/lending systems, mobile device users may obtain small loans or other financial services. Communications with such mobile finance customers may be conducted using their mobile devices; however, behavioral cues indicated by location based data have been unutilized in such contexts.

Accordingly, an embodiment provides a system for prioritizing mobile finance customer follow-up actions based on mobile device location data. By way of example, an embodiment may be implemented as a communication system for micro-finance where communications to a mobile device of a mobile finance customer are prioritized based on processing the mobile finance customer's device location data for behavioral cues. Such behavioral cues may include (but are not limited to) behaviors that are associated with positive attributes (e.g., mobile finance customers are low risk) and/or negative attributes (e.g., mobile finance customers are at risk).

An embodiment may employ the location based data of the mobile device in an effort to determine behavioral cues such that follow-up action communications are prioritized, taking into consideration the behavioral cues. For example, in response to a user opt-in, an embodiment may form a mobility profile for the user based on the user's location data, e.g., obtained for example from a user's mobile GPS capability and collected using an installed mobile application.

Based on the location data, an embodiment may formulate a variety of follow-up actions that are of interest to various users or entities. By way of example, an embodiment may send an alert communication based on a mobile finance customer's location data indicating that the mobile finance customer is exhibiting at-risk or low-risk behavior. Similarly, an embodiment may communicate helpful suggestions to the mobile finance customer regarding the behavior-based determination. As a further example, an embodiment may communicate a promotion, offer, reward or other communication based on the behavior-based determination.

Referring now to FIG. 1, a mobile platform 101 is utilized to gather and integrate data from a variety of sources, e.g., a financial institution, a plurality of mobile user devices, etc. For example, the mobile platform 101 may gather and transmit data 102 of a financial institution regarding mobile finance customers that have opted into a behavior-patterning program based on mobile device location. The data 102 transmitted by the mobile platform 101 may include data relating to loan application(s), customer interaction(s), mobile payment(s), call record(s), and mobility profile data. These data 102, or a subset thereof, are communicated by the mobile platform 101 to a communications system 103. Additionally, the communications system 103 may have access to additional data, e.g., follow-up action communications budget data, as indicated at 104 of FIG. 1.

The communications system 103 utilizes the data in order to determine possible follow up actions, e.g., communications to be sent to a mobile finance customer regarding a mobile finance account. By way of specific example, a payment due notice or collection communication may be transmitted by the communications system 103 to a mobile device of a mobile finance customer. Communications system 103 may also transmit communications to other devices, e.g., transmit communications to a financial institution or to a third party or other entity, such as communications related to the account status of a mobile finance customer.

In an embodiment, the communications system 103 utilizes behavioral cues, such as learned by consulting a mobility profile (included in data 102), that indicate that mobile finance customers exhibit certain traits based on the mobile finance customers' location-time associations. In an embodiment, mobile device location data may be used to identify behavioral cues and further to identify a best course of action regarding the behavioral cues, e.g., proactive communication with the mobile finance customer. As each such action may be associated with a cost, e.g., a cost of sending an SMS, providing an automated reminder call, etc., follow-up action budget data 104 may be taken into account by communications system 103 in determining the best course of action.

Figure 2:
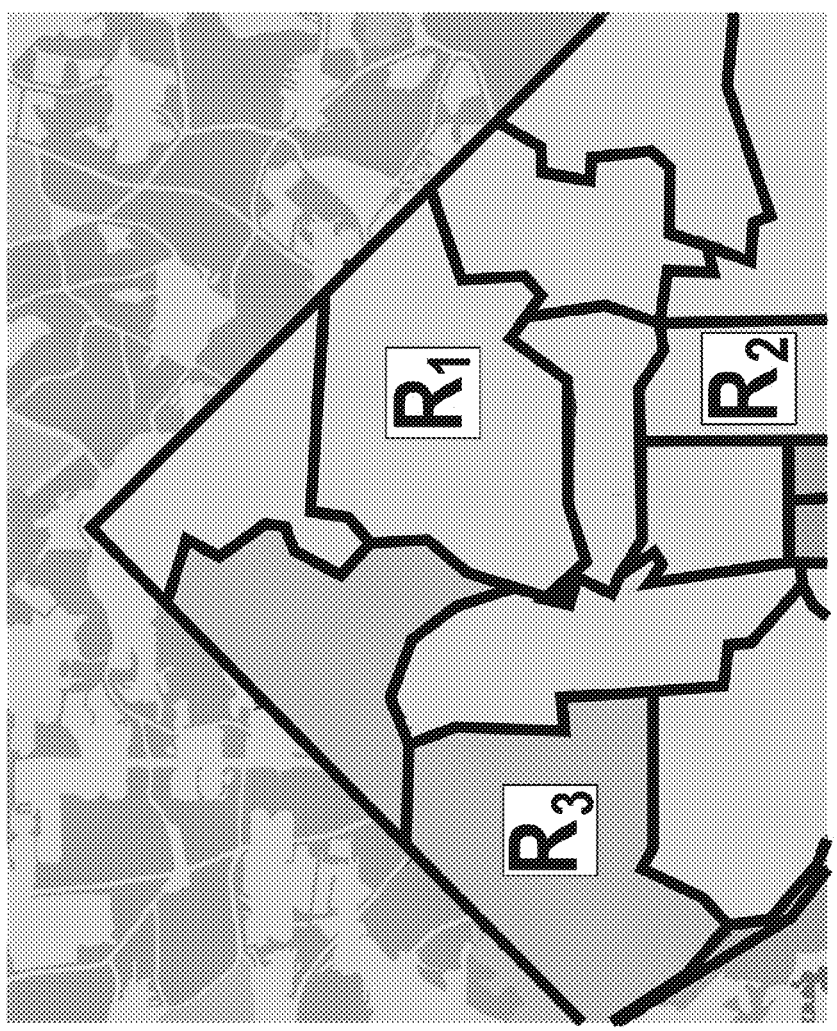
FIG. 2 illustrates an exemplary mapping of geographic locations with attributes for use with mobile device location data.

The mobility profile (included in data 102 of FIG. 1) may be formed based on mobile device location data and used to determine or identify behavioral cues. As illustrated in FIG. 1, by way of example, an embodiment may generate a mobility profile for a user that has opted into the service by evaluating location based behavioral patterns (e.g., deviations from normal location based data derived from the user's mobile device) as well as geographic places of interest. For example, indicated in FIG. 2 are three geographic areas, "$R_1$," $R_2$," and $R_3$" that have been associated with a know risk score, e.g., a quantitative risk score based on known activities or other attributes associated with those geographic locations. The quantitative risk score may be positive or negative.

The mobility profile may be based on an initial data set with a curated list of regions or geographic locations associated with a quantitative risk. The associated risk can be obtained from various sources, including credit bureau ratings of map data, institutions located in the geographic regions, population demographics, etc. The initial list may be automatically updated by an embodiment, e.g., based on learning from the data (e.g., inferences drawn from underlying electronic map data).

The risk associated with a particular geographic location may be associated or attributed to a mobile finance customer using location data, e.g., derived from the mobile device(s) associated with that mobile finance customer. By way of example, a mobility profile may include data indicating how much time a mobile finance customer spends in a particular geographic region. Such data, referred to herein as dwell location data, relate to how much time the mobile device associated with a particular mobile finance customer spends in geographic location(s) of interest. In an embodiment, the dwell location data may be non-transactional data, i.e., the dwell location data attributed to the customer may not relate to transactions performed within the geographic region and may rather simply be presence data.

Figure 3:
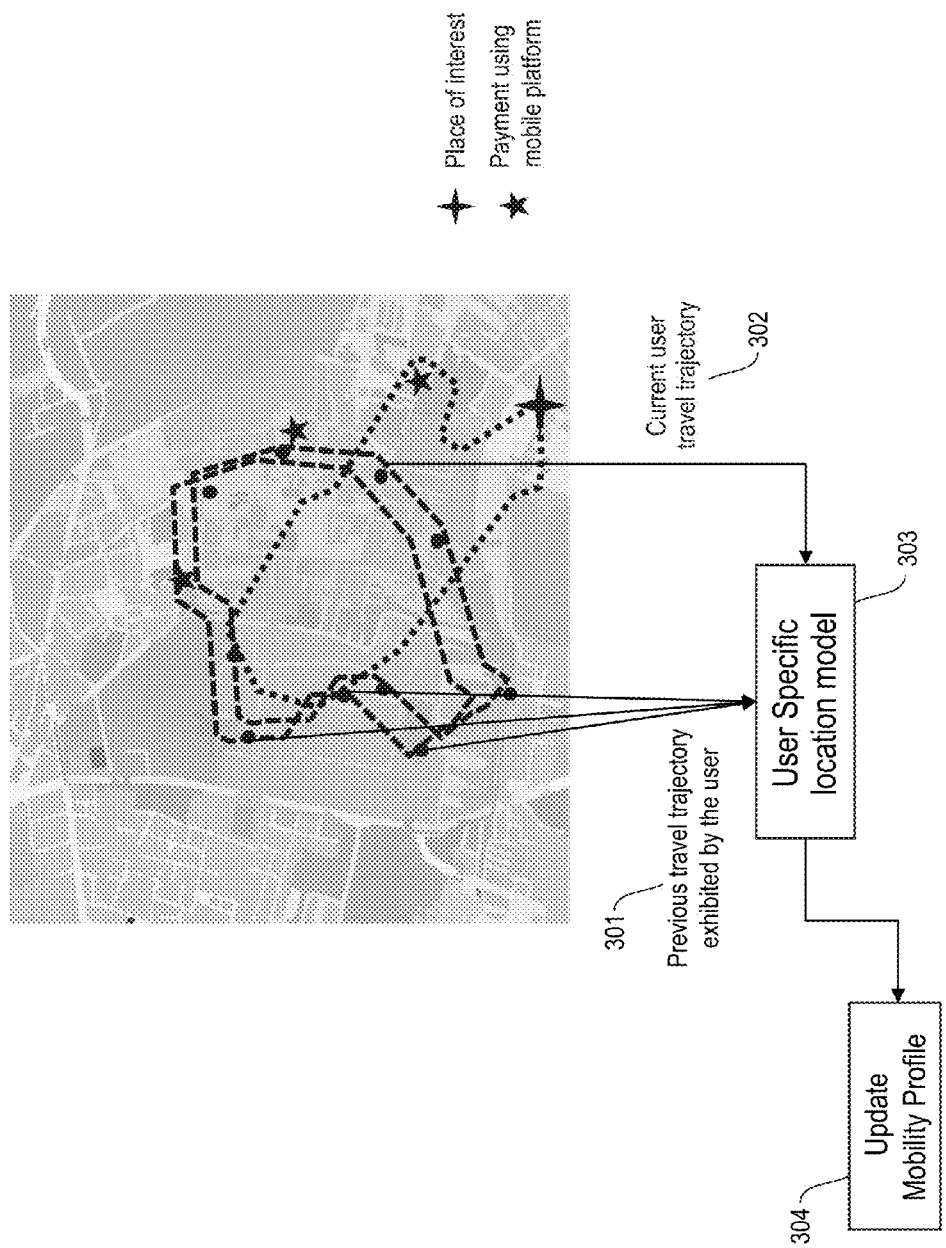
FIG. 3 illustrates an exemplary method of updating a mobility profile based on mobile device location data.

An embodiment may provide updates to the mobility profile of a mobile finance customer based on dwell location data and changes thereto over time. As illustrated in FIG. 3, an embodiment may obtain location data from the mobile finance customer's mobile device over time. An embodiment collects a set of mobility trajectories from mobile device location systems (e.g., GPS data reported by a mobile finance customer's mobile device via a mobile application running thereon). By way of specific example, an embodiment may collect GPS data at certain intervals (e.g., every minute, every hour, etc.) or dynamically (e.g., on entry into a particular geographic region of interest, based on acceleration data sensed by the mobile device, at a particular time of day, etc.). An embodiment also collects location data, which may be time stamped, regarding where payments or transactions are made, e.g., using a mobile platform and/or smart cards.

An embodiment utilizes the location based data to determine attributes for the mobile finance customers. For example, customers that exhibit low variation in their mobility profile (as described further herein) may be associated with behavior that is highly predicable. A minimization approach captures the variations between trajectories, e.g., variation between consecutive trajectories on consecutive days or other time periods.

Thus, an embodiment may obtain and store (or have access to) a previous travel trajectory exhibited by the user, as indicated at 301. Likewise, an embodiment may obtain and store (or have access to) a current user travel trajectory, as indicated at 302. Thus, differences between the previous travel trajectory data 301 and the current travel trajectory data 302 may be used to update a user specific location model, as indicated at 303. Likewise, the updated user specific location model 303 may influence or adjust the mobile finance customer's mobility profile, as indicated at 304.

Additional data may be utilized in order to form a behavioral pattern for a mobile finance customer. By way of example, social networking data (e.g., communications with other mobile financial customers) may be utilized to determine or predict behavioral patterns. By way of example, a first mobile finance customer may be associated with a second mobile finance customer by way of identifying a communication between the devices of the first and second mobile finance customers. An attribute of the first mobile finance customer may be attributed to the second mobile finance customer, or vice versa, based on such communication patterns. Sources of such social networking data may include but are not limited to contacts lists in the mobile device of a mobile finance customer, phone numbers called or received by a mobile device of a mobile finance customer, etc. Weights and strengths of such associations, e.g., such as the strength of an edge in a social network graph, may be enhanced using additional data, e.g., call log data.

Referring back to FIG. 1, an embodiment may utilize the data available to the communications system 103 in order to prioritize follow-up action communications with mobile finance customers. By way of example, an embodiment may select from possible actions, e.g., payment due notification text message versus an automated voice call, based on a mobility profile that takes into account a customer's location data as well as other factors, e.g., follow-up action budget allotted for interfacing with certain customers. An associated action or set of actions and cost for each may be determined by an embodiment. The actions identified or selected may be based on a variety of factors, including but not limited to an expected outcome of the action (e.g., communication) and a probability of achieving that outcome.

An optimized approach may be used to compute an action or set of actions to maximize the probability of success for each such action for all users in question, constrained to a total budget, e.g., to achieve a particular response to a given communication for a maximum number of customers with a given cost for deploying the action.

By way of example, the communications system may obtain user specific models based on collected and processed data, e.g., user mobility profiles, and obtain a list of predetermined actions that may be taken in response to the indications of the mobility profiles. By way of specific example, an embodiment may associate mobile finance customers that frequent geographic locations known to be low risk and obtain predetermined actions, e.g., promotions or additional offers for these customers. Given the mobility profiles and the predetermined actions, an embodiment may also access follow-up action budget data, e.g., a cost of the predetermined follow-up actions as well as an expected response and probability of response for the follow-up actions. An embodiment may then calculate a top-k list of follow-up actions to employ in order to maximize the expected response (e.g., acceptance of promotional offers) while remaining within a total cost indicated by the budget.

As may be appreciated then, an embodiment offers an improved technical ability to identify customer behavior cues using location based data. Moreover, an embodiment provides for automated actions, e.g., follow-up action communications, that may be implemented based on the behavioral cues of the customers. In this way, an embodiment improves the return or benefit of specific follow-up actions.

Figure 4:
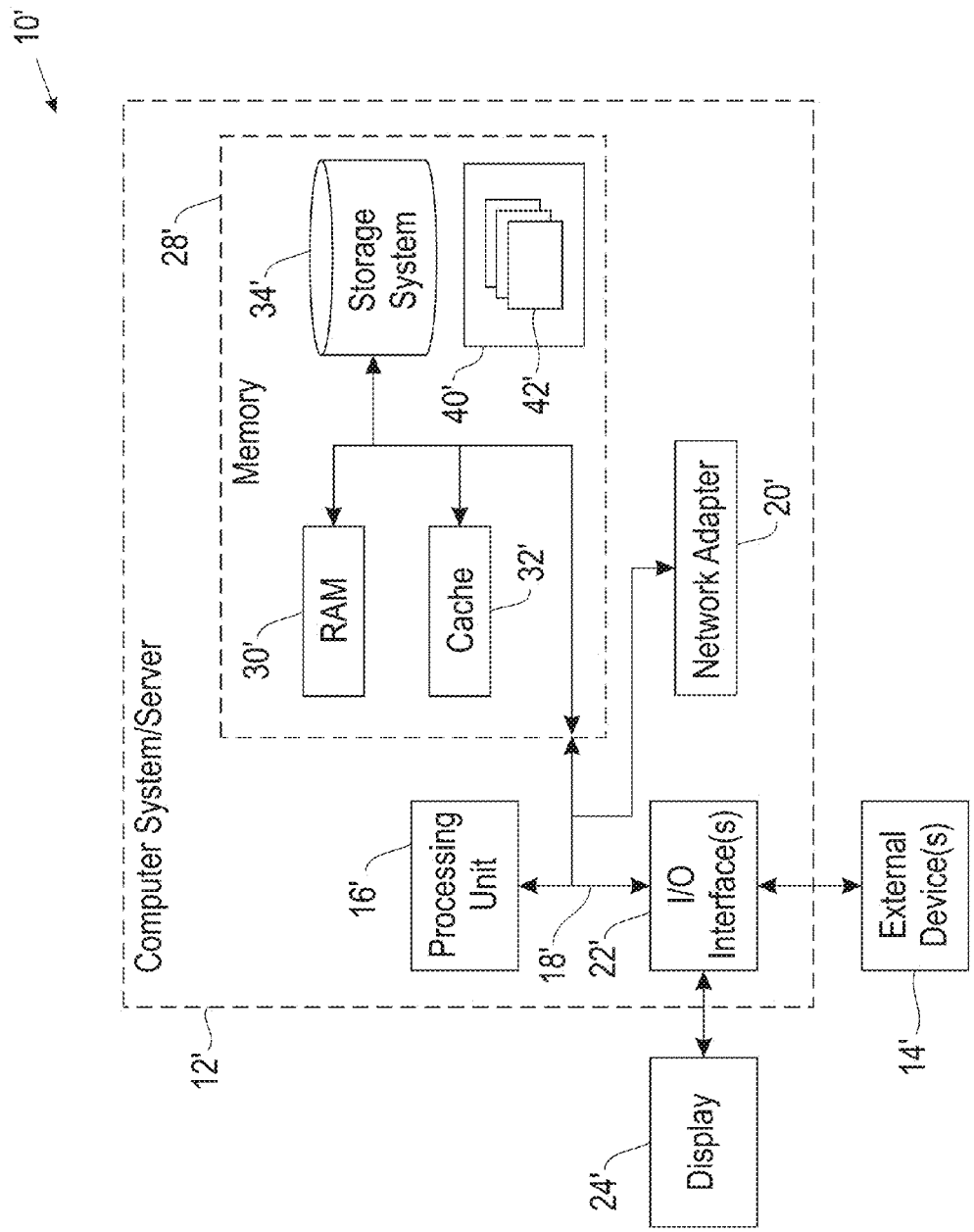
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of prioritizing mobile finance customer follow-up actions based on mobile device location data, the method comprising:
    utilizing at least one processor to execute computer code that performs the steps of:
    associating a mobile finance customer account with a mobile device;
    receiving a plurality of locations of the mobile device, the plurality of locations including at least one non-transactional location associated with a predetermined geographic location of interest, wherein each of the plurality of locations are associated with a risk score, the risk score identifying a financial risk of the location and being based upon attributes associated with the location;
    forming a mobility profile based on the plurality of locations, wherein the mobility profile identifies locations of presence of the mobile device and an amount of time the mobile device is present in a particular location;
    selecting, using a processor, a follow up action type based at least in part on the mobility profile, wherein the selecting comprises prioritizing follow-up actions based on (i) behavioral patterns of a user of the mobile device identified from the mobility profile and (ii) a probability of success for each possible action; and
    transmitting, using a mobile network, a communication of the follow up action type to the mobile device.

2. The method of claim 1, wherein the at least one non-transactional location is a dwell location in which the mobile device remains for at least a threshold amount of time.

3. The method of claim 2, wherein the dwell location is within the predetermined geographic location of interest.

4. The method of claim 3, wherein the predetermined geographic location is assigned a known account risk.

5. The method of claim 4, wherein the forming a mobility profile comprises adjusting a risk factor assigned to the mobile finance customer account based on the amount of time spent at the dwell location.

6. The method of claim 1, wherein the follow up action type is a payment reminder.

7. The method of claim 1, wherein the forming a mobility profile based on the plurality of locations comprises comparing the plurality of locations to previously visited locations.

8. The method of claim 7, wherein the previously visited locations are specific to the mobile finance customer.

9. The method of claim 8, wherein the mobility profile includes a location variance indication.

10. The method of claim 9, wherein the forming a mobility profile comprises adjusting a risk factor assigned to the mobile finance customer account based on the variance indication.

11. An apparatus for prioritizing mobile finance customer follow up actions based on mobile device location data, the apparatus comprising:
at least one processor; and
a computer readable storage medium having computer readable program code embodied therewith and executable by the at least one processor, the computer readable program code comprising:
computer readable program code that associates a mobile finance customer account with a mobile device;
computer readable program code that receives a plurality of locations of the mobile device, the plurality of locations including at least one non-transactional location associated with a predetermined geographic location of interest, wherein each of the plurality of locations are associated with a risk score, the risk score identifying a financial risk of the location and being based upon attributes associated with the location;
computer readable program code that forms a mobility profile based on the plurality of locations, wherein the mobility profile identifies locations of presence of the mobile device and an amount of time the mobile device is present in a particular location;
computer readable program code that selects, using a processor, a follow up action type based at least in part on the mobility profile, wherein the selecting comprises prioritizing follow-up actions based on (i) behavioral patterns of a user of the mobile device identified from the mobility profile and (ii) a probability of success for each possible action; and
computer readable program code that transmits, using a mobile network, a communication of the follow up action type to the mobile device.

12. A computer program product for prioritizing mobile finance customer follow up actions based on mobile device location data, the computer program product comprising:
a computer readable storage medium having computer readable program code embodied therewith, the computer readable program code comprising:
computer readable program code that associates a mobile finance customer account with a mobile device;
computer readable program code that receives a plurality of locations of the mobile device, the plurality of locations including at least one non-transactional location associated with a predetermined geographic location of interest, wherein each of the plurality of locations are associated with a risk score, the risk score identifying a financial risk of the location and being based upon attributes associated with the location;
computer readable program code that forms a mobility profile based on the plurality of locations, wherein the mobility profile identifies locations of presence of the mobile device and an amount of time the mobile device is present in a particular location;
computer readable program code that selects, using a processor, a follow up action type based at least in part on the mobility profile, wherein the selecting comprises prioritizing follow-up actions based on (i) behavioral patterns of a user of the mobile device identified from the mobility profile and (ii) a probability of success for each possible action; and
computer readable program code that transmits, using a mobile network, a communication of the follow up action type to the mobile device.

13. The computer program product of claim 12, wherein the at least one non-transactional location is a dwell location in which the mobile device remains for at least a threshold amount of time.

14. The computer program product of claim 13, wherein the dwell location is within the predetermined geographic location of interest.

15. The computer program product of claim 14, wherein the predetermined geographic location is assigned a known account risk.

16. The computer program product of claim 15, wherein the computer readable program code that forms a mobility profile comprises computer readable program code that adjusts a risk factor assigned to the mobile finance customer account based on the amount of time spent at the dwell location.

17. The computer program product of claim 12, wherein the follow up action type is a payment reminder.

18. The computer program product of claim 12, wherein the computer readable program code that forms a mobility profile based the plurality of locations comprises computer readable program code that compares the plurality of locations to previously visited locations.

19. The computer program product of claim 17, wherein:
the previously visited locations are specific to the mobile finance customer;
the mobility profile includes a location variance indication; and
the computer readable program code that forms a mobility profile comprises computer readable program code that adjusts a risk factor assigned to the mobile finance customer account based on the variance indication.

20. A method of prioritizing mobile finance customer follow up actions based on mobile device location data, the method comprising:
utilizing at least one processor to execute computer code that performs the steps of:
with a mobile device associated a mobile finance customer account, detecting a plurality of locations of the mobile device over a communications network, the plurality of locations including at least one non-transactional location associated with a predetermined geographic location of interest assigned a known account risk, wherein the known account risk identifies a financial risk of the geographic location and is based upon attributes associated with the geographic location;
adjusting, using a processor of the mobile device, a risk factor assigned to the mobile finance customer account based on the amount of time spent at the non-transactional location associated with geographic location of interest;
selecting, using a processor of the mobile device, a follow up action type based at least in part on a mobility profile comprising location data specific to the mobile finance customer, wherein the mobility profile identifies locations of presence of the mobile device and an amount of time the mobile device is present in a particular location and wherein the selecting comprises prioritizing follow-up actions based on (i) behavioral patterns of a user of the mobile device identified from the mobility profile and (ii) a probability of success for each possible action; and providing, using an output device of the mobile device, a follow up action of the follow up action type selected.

\* \* \* \* \*